R. H. Staples.
Chair.
No. 1,986. Reissued June 6, 1865.
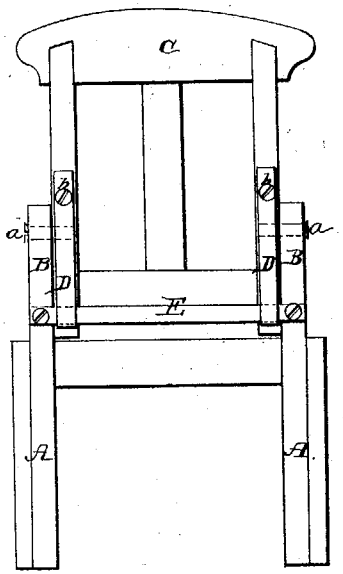
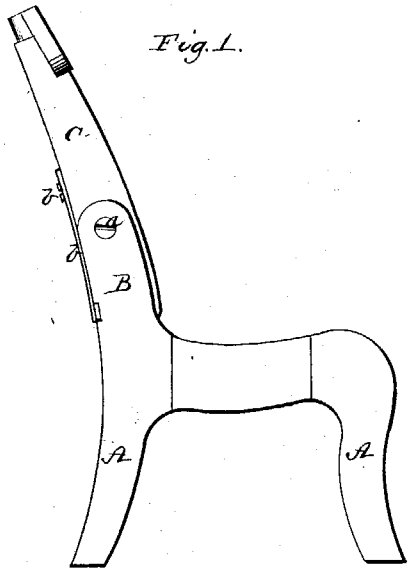
Witnesses:
P. B. Teschemacher
N. W. Stearns,
Inventor:
Robert H. Staples,
N. PETERS, PHOTO-LITHOGRAPHER, WASHINGTON, D. C.

UNITED STATES PATENT OFFICE.

ROBERT H. STAPLES, OF LOWELL, MASSACHUSETTS.

IMPROVED SPRING-BACK CHAIR.

Specification forming part of Letters Patent No. 44,987, dated November 8, 1864; Reissue No. 1,986, dated June 6, 1865.

*To all whom it may concern:*

Be it known that I, ROBERT H. STAPLES, of Lowell, in the county of Middlesex and State of Massachusetts, have invented certain new and useful Improvements in Chairs, of which the following is a full, clear, and exact description, reference being had to the accompanying drawings, making part of this specification, in which—

Figure 1 is a side elevation of a chair with my improvements applied thereto. Fig. 2 is a back elevation of the same.

My invention has for its object to produce a chair in which the back will accommodate itself to the movements and ease of the occupant; and it consists in a back swinging independently of the seat, and pivoted above it to stationary supports or to the arms of the chair, a suitable spring or springs being employed to return it to its normal position when the chair is vacated.

To enable others skilled in the art to understand and use my invention, I will proceed to describe the manner in which I have carried it out.

In the said drawings, A represents the legs of the chair; B, the stationary portion of the back, to which is pivoted above the seat, by means of pins *a*, the independent swinging back C.

D are springs which are secured to the swinging back C at *b*, and extend down over a cross-bar E, which is attached to the stationary portion of the back B, and serves as a stop for the swinging back C.

It will thus be seen that the swinging back C adapts itself readily to the movements and ease of the occupant by turning on the pivots *a* against the resistance of the springs D, by which it is returned to its normal position on the chair being vacated.

I do not confine myself to the form of spring here shown, which returns the independent swinging back to its normal position, as it is evident that springs of a different form and arrangement may be employed for this purpose without departing from the spirit of my invention.

It is also evident that the swinging back may be pivoted as above described and the springs dispensed with. I prefer, however, to use springs to return it to its normal position.

What I claim as my invention, and desire to secure by Letters Patent, is—

A back swinging independently of the seat, and pivoted above it to stationary supports or to the arms of the chair, in combination with a spring or springs, or equivalent device, to return it to its normal position.

ROBERT H. STAPLES.

Witnesses:

P. E. TESCHEMACHER,

N. W. STEARNS.